Jan. 10, 1961  D. R. WILLIS  2,967,931
WAVE METERS
Filed Dec. 19, 1956
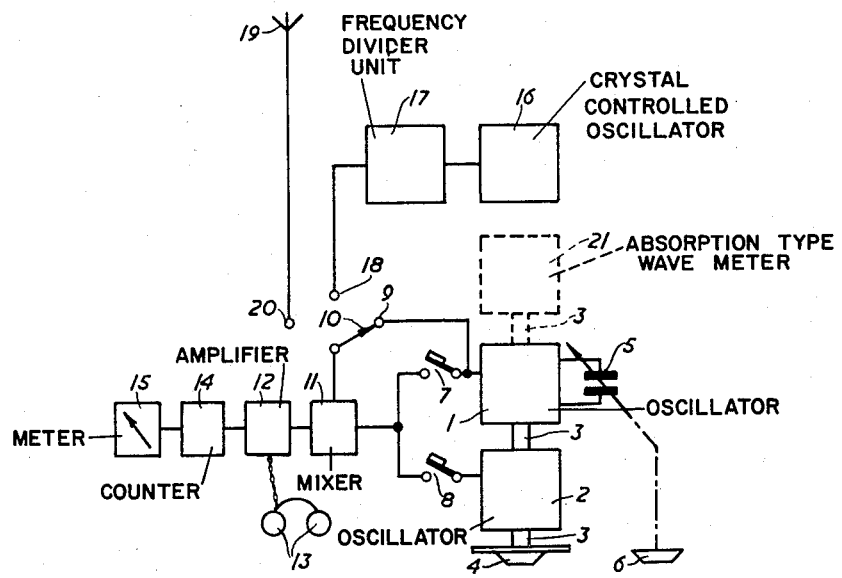
INVENTOR:
Douglas Ray Willis
BY:
Baldwin & Wight
ATTORNEYS United States Patent Office 2,967,931
Patented Jan. 10, 1961

2,967,931
WAVE METERS

Douglas Ray Willis, Leverstock Green, England, assignor to Marconi Instruments Limited, London, England, a British company Filed Dec. 19, 1956, Ser. No. 629,408

Claims priority, application Great Britain Dec. 21, 1955

3 Claims. (Cl. 250—39)

This invention relates to wave meters for measuring radio and similar frequencies.

Broadly speaking there are two types of wave meter at present in common use for radio frequency measurement. In the first type of wave meter, known as the absorption type, a calibrated adjustably tuneable circuit is adjusted to resonance with the frequency to be measured and an indicator is used to indicate the condition of resonance. The type of instrument has the disadvantage that it usually requires a considerable number of interchangeable tuned circuits to cover the whole range of frequencies in which a frequency to be measured may lie. It also has the serious disadvantage that the accuracy of measurement is not high. It has, however, the advantage that the readings it gives are free from ambiguity.

The second type of meter at present in common use is the so-called heterodyne wave meter. In this type of instrument a calibrated heterodyne oscillator is adjusted to beat with the frequency to be measured until zero beat frequency (the occurrence of which is usually indicated by a pair of headphones) is obtained. This type of meter can be designed to cover frequencies harmonically related to the oscillator frequencies and can also measure frequencies below the oscillator fundamental frequency range by using the oscillator to beat with harmonics of the unknown frequency. Heterodyne frequency meters have the advantage of high accuracy but the disadvantage of a certain liability to ambiguity in the readings obtained. In order to maintain high accuracy it is common, in heterodyne wave meters to provide a "check" frequency source, such as a crystal controlled oscillator, adapted to supply a number of check frequencies at spaced points in the frequency range of the heterodyne oscillator. Output from this source is used to beat with the heterodyne oscillator and thus gives a series of "check points" over the oscillator band. When the wave meter is used the calibration of the heterodyne oscillator is checked against one of the check frequencies which is as near as possible to the unknown frequency to be measured and the heterodyne oscillator is then adjusted to give zero beat with the unknown by varying a condenser in its frequency determining circuit. Obviously in such a case the accuracy of the final reading obtained will depend upon the accuracy of calibration of the condenser. Accordingly this condenser has to be precisely made to follow a known law of variation and is therefore an expensive item.

The present invention has for its object to provide an improved and simple wave meter of the heterodyne type which shall be of high accuracy and not dependent for that accuracy upon the precise maintenance of a predetermined law of variation of a variable tuning reactance.

According to this invention a heterodyne wave meter comprises two variable frequency oscillators; common frequency varying control means therefor; means independent of said common control means for varying the frequency of one of said oscillators over a relatively small range of frequencies; a check frequency source; a mixer; switch means adapted to select at will as inputs to said mixer any two of the following frequencies, namely, the frequencies from the two oscillators, a frequency from the check frequency source and a frequency to be measured; and means for measuring the output beat frequency from said mixer. As will be understood later, the means for measuring the output beat frequency from the mixer can be readily checked or standardized with reference to the check frequency source.

Preferably means, additional to said means for measuring said output beat frequency, are provided for indicating the presence of zero output beat frequency from the mixer.

Preferably the wave meter also includes an absorption type wave meter controlled by the common frequency varying control means for the two oscillators.

Again preferably the means for measuring the output beat frequency from the mixer is of the counter type.

The invention is illustrated in the accompanying block diagrammatic drawing which shows a preferred embodiment thereof.

Referring to the drawing the wave meter therein shown comprises two oscillators 1 and 2. Each of these oscillators has the usual variable frequency determining circuit (not separately shown) comprising an inductance and a variable condenser in parallel therewith. The condensers of these tuned circuits are gang controlled by the same shaft 3 on the end of which is a control knob 4 moving over a scale (not shown). The tuned circuit of the oscillator 1 also includes an additional small variable condenser 5 in parallel with the main tubing condenser (not shown) and separately adjustable by a control knob 6. The condenser 5 is adapted to a range of tuning variation which is small in relation to that given by the main condenser of the oscillator 1. The control knob 6 leading to variable condenser 5 permits the change of the operating frequency of oscillator 1 without changing the operating frequency of oscillator 2.

The outputs from the oscillators 1 and 2 can be fed at will through switches 7 and 8—and, in the case of oscillator 1, through one contact 9 of a three-position switch whose control arm is shown at 10—to a mixer 11. The output of the mixer feed into a low frequency (L.F.) amplifier 12, the beat frequency in which can be heard by means of a pair of telephones 13. Output from the amplifier 12 is fed to any convenient known form of counter circuit 14 whose indicating meter is conventionally indicated at 15. Block 16 represents a crystal controlled oscillatory source the output from which is fed to a frequency divider unit 17 which supplies its output to a second contact 18 of the three-position switch. The combination of crystal source 16 and divider unit 17 constitutes a check frequency source as well known per se adapted to supply a number of accurately pre-determined frequencies distributed over the working range. The unknown frequency to be measured, here exemplified as provided by an aerial 19, is applied to a third contact 20 of the three-position switch. To quote practical figures purely by way of example, the source 16 may be a 100 kc./s. crystal controlled source and the divider 17 a decade divider, the combination 16—17 being adapted to supply one hundred frequencies spaced 10 kc./s. apart over the range of oscillator 2. For this case the scale over which the knob 4 operates would be calibrated with indicia for multiples of 10 kc./s. over its range of, say, 1–2 mc./s., the instrument as a whole being adapted to measure any incoming frequency from 50 c./s. to 100 mc./s. Frequencies below 10 kc./s. can be measured directly by injection into the counter system comprising the parts 11, 12, 14 and 15 with the control arm of switch 10 on contact 20 and the switches 7 and 8 open; frequencies between 10 kc./s. and the frequency of oscillator 2 (say 1 mc./s.) by using harmonics of the input frequency on the aerial; and frequencies above that of oscillator 2 by using harmonics of that frequency.

If the switch 7 is open, the switch 8 closed and the control arm of switch 10 on contact 20, the output from oscillator 2 and the unknown frequency from aerial 19 will be applied to the mixer 11 and the knob 4 can be adjusted until zero beat is heard in the headphones 13. Control arm of switch 10 can then be moved on to contact 18 and the knob 4 re-adjusted until zero beat is obtained between the output of oscillator 2 and the nearest check frequency from divider 17 below the frequency to which oscillator 2 was previously adjusted. From this point onwards knob 4 is not further adjusted. In the position to which it is now adjusted the scale reading of knob 4 will indicate a whole multiple of 10 kc./s.

Switch 8 can now be opened, switch 7 closed, and the control arm 10 put back on contact 20. The knob 6 can now be adjusted until zero beat is again heard in the headphones 13 between the output from oscillator 1 and the unknown frequency from aerial 19.

If control arm 10 is now moved over to contact 9, switch 7 opened and switch 8 closed, the mixer 11 will produce the beat frequency between the two oscillators 1 and 2 and this will be counted by the counter 14 and the count indicated as a frequency by the meter 15. The reading of the meter 15 plus that indicated by the scale on the knob 4 will give the value of the unknown frequency.

As already stated the instrument can also be used to measure frequencies below 10 kc./s. by moving switch arm 10 to contact 20 and opening contacts 7 and 8. The instrument will then directly measure the incoming frequency but, of course, the accuracy of measurement will only be that of the counter section and substantially less that when measuring frequencies with the aid of the local oscillator section of the instrument.

If desired, and in order to remove any risk of ambiguity, an ordinary, known, absorption type of wave meter 21 gang controlled with the oscillators 1 and 2 by the same shaft 3 may be provided as indicated in dotted lines. Such a wave meter is optional. It need not be of high accuracy or quality for its only purpose is to eliminate ambiguity.

I claim:

1. A heterodyne wave meter comprising a source of test frequency to be measured, first and second variable frequency oscillators, said oscillators being operative over the same frequency range and having common control frequency varying means, means independent of said common control for varying the frequency of said second oscillator over a relatively small range of frequencies, a check frequency source, a mixer, a counter circuit responsive to the output of said mixer, means to apply to said mixer selectively at will, first: the test frequency and oscillations from said first variable frequency oscillator so as to provide a zero or low beat frequency to compare said frequencies to a first order; second: the oscillations generated by said check frequency source and said first or second oscillator for checking the frequency of the latter oscillators; third: the test frequency and oscillations from the second variable frequency oscillator whereby said independently variable means may be adjustable to provide exact coincidence between the test frequency and said oscillations; or fourth: the oscillations from said first and second variable frequency oscillators whereby said counter indicates the beat frequency between said variable frequency oscillators and provides an accurate indication of the test frequency in conjunction with the frequency indicated by the oscillation frequency of said first variable frequency oscillator.

2. A wave meter as claimed in claim 1 wherein means, additional to said counter for indicating the beat frequency between said variable frequency oscillator, are provided for indicating the presence of zero output beat frequency from the mixer.

3. A wave meter as claimed in claim 1 wherein the wave meter also includes an absorption type wave meter controlled by the common frequency varying control means for the two oscillators.

References Cited in the file of this patent

UNITED STATES PATENTS

| | | |
|---|---|---|
| 1,864,543 | Horton | June 28, 1932 |
| 1,982,340 | Forbes | Nov. 27, 1934 |
| 2,186,182 | Stocker | Jan. 9, 1940 |
| 2,478,023 | Summerhayes | Aug. 2, 1949 |
| 2,491,494 | Grimm | Dec. 20, 1949 |
| 2,763,836 | Bullock | Sept. 18, 1956 |

FOREIGN PATENTS

| | | |
|---|---|---|
| 566,906 | Great Britain | Jan. 18, 1945 |

OTHER REFERENCES

"Precision Heterodyne Frequency Meter Type 504" in PRD Technical Data, a publication of polytechnic Research and Development Co., Inc., 202 Tillary St., Brooklyn, New York.